United States Patent
Ajmera et al.

(10) Patent No.: US 9,052,117 B2
(45) Date of Patent: Jun. 9, 2015

(54) INTERMEDIATE PANEL CEILING FOR CONVEYOR OVEN

(76) Inventors: Sam Ajmera, Concord (CA); Tejus Ajmera, Concord (CA); Dragan Janus, Concord (CA); Peter Janus, Concord (CA)

(*) Notice: Subject to any disclaimer, the term of this patent is extended or adjusted under 35 U.S.C. 154(b) by 973 days.

(21) Appl. No.: 13/054,247

(22) PCT Filed: Jul. 16, 2008
(Under 37 CFR 1.47)

(86) PCT No.: PCT/CA2008/001317
§ 371 (c)(1),
(2), (4) Date: Jul. 29, 2011

(87) PCT Pub. No.: WO2010/006404
PCT Pub. Date: Jan. 21, 2010

(65) Prior Publication Data
US 2012/0270171 A1   Oct. 25, 2012

(51) Int. Cl.
*A21B 1/00*   (2006.01)
*F24C 15/00*   (2006.01)
(Continued)

(52) U.S. Cl.
CPC ............. *F24C 15/007* (2013.01); *A21B 1/50* (2013.01); *A21B 3/00* (2013.01)

(58) Field of Classification Search
USPC ............ 432/121, 136, 143, 144, 146; 99/386, 99/387, 391, 443 C, 477, 401, 447, 393, 99/247
See application file for complete search history.

(56) References Cited

U.S. PATENT DOCUMENTS

| | | | | |
|---|---|---|---|---|
| 980,680 A | * | 1/1911 | Ross | 126/275 R |
| 1,711,143 A | * | 4/1929 | Gloekler | 312/408 |
| 2,305,056 A | | 12/1942 | Austin | |

(Continued)

FOREIGN PATENT DOCUMENTS

| | | |
|---|---|---|
| AU | 580536 B3 | 3/1988 |
| CA | 1148815 A | 6/1983 |

(Continued)

OTHER PUBLICATIONS

Recipetips.com, Naan Bread, Definition and Cooking Information, www.recipetips.com/glossary-term/t-34773/naan-bread.asp, 2 pages, Apr. 10, 2004.

(Continued)

*Primary Examiner* — Steven B McAllister
*Assistant Examiner* — Ko-Wei Lin
(74) *Attorney, Agent, or Firm* — McDonnell Boehnen Hulbert & Berghoff LLP

(57) ABSTRACT

A conveyor oven is provided. The oven housing has a substantially rectangular box frame, clad with a top wall and side walls downwardly depending from the top wall, and a bottom wall connecting the side walls, all defining an interior baking chamber. The baking chamber is heated by a heat source in excess of 7O00F. An endless conveyor transports food items to be baked through the baking chamber. The oven has an intermediate panel ceiling assembly disposed within the baking chamber. The assembly has a plurality of ceiling panel holders mounted above the conveyor and spaced below the top wall, each ceiling panel holder substantially spanning the width of the baking chamber. At least one ceiling panel is held within each ceiling panel holder, which is exposed on both sides to the baking chamber for absorbing and distributing heat in the baking chamber.

17 Claims, 3 Drawing Sheets

(51) Int. Cl.
*A21B 1/50* (2006.01)
*A21B 3/00* (2006.01)

(56) References Cited

U.S. PATENT DOCUMENTS

| | | | |
|---|---|---|---|
| 3,088,396 A * | 5/1963 | Proffitt | 99/443 R |
| 3,357,475 A | 12/1967 | Schweitzer | |
| 3,861,378 A | 1/1975 | Rhoads et al. | |
| 3,993,788 A | 11/1976 | Longenecker | |
| 4,023,007 A | 5/1977 | Brown | |
| 4,045,166 A | 8/1977 | Kaleel | |
| 4,188,868 A | 2/1980 | Baker et al. | |
| 4,202,911 A | 5/1980 | Papantoniou et al. | |
| 4,252,055 A | 2/1981 | Johansson et al. | |
| 4,383,823 A | 5/1983 | Williams et al. | |
| 4,389,562 A | 6/1983 | Chaudoir | |
| 4,462,307 A | 7/1984 | Wells | |
| 4,504,221 A | 3/1985 | Hartmann | |
| 4,542,268 A * | 9/1985 | Jarvis et al. | 219/685 |
| 4,591,333 A | 5/1986 | Henke | |
| 4,599,938 A | 7/1986 | Gongwer | |
| 4,739,154 A | 4/1988 | Bharara et al. | |
| 4,951,648 A * | 8/1990 | Shukla et al. | 126/21 A |
| 5,686,004 A | 11/1997 | Schneider | |
| 5,826,496 A | 10/1998 | Jara | |
| 5,832,810 A | 11/1998 | Brawley, Sr. et al. | |
| 5,979,302 A | 11/1999 | Funk et al. | |
| 6,291,002 B1 | 9/2001 | Goglanian | |
| 6,425,388 B1 | 7/2002 | Korinchock | |
| 6,550,373 B2 | 4/2003 | Hafezan et al. | |
| 6,707,014 B1 | 3/2004 | Corey et al. | |
| 6,776,612 B2 | 8/2004 | Backowski et al. | |
| 6,933,473 B2 | 8/2005 | Henke et al. | |
| 7,026,579 B2 | 4/2006 | Burtea | |
| 7,091,452 B2 | 8/2006 | Kingdon et al. | |
| 7,921,767 B2 * | 4/2011 | Cook et al. | 99/328 |
| 2003/0041851 A1 | 3/2003 | Kingdon et al. | |
| 2003/0196346 A1 | 10/2003 | Schmidt | |
| 2005/0235980 A1 | 10/2005 | Hansen et al. | |
| 2007/0006865 A1 | 1/2007 | Wiker et al. | |
| 2011/0020492 A1 | 1/2011 | Ajmera et al. | |
| 2011/0151052 A1 | 6/2011 | Ajmera et al. | |
| 2012/0040066 A1 | 2/2012 | Ajmera et al. | |
| 2012/0189743 A1 | 7/2012 | Ajmera et al. | |

FOREIGN PATENT DOCUMENTS

| | | | |
|---|---|---|---|
| CA | 2210967 A1 | 1/1998 | |
| CA | 2343881 A1 | 10/2000 | |
| DE | 2107220 A1 | 8/1972 | |
| FR | 2398459 | 2/1979 | |
| FR | 2565068 A1 | 12/1985 | |
| GB | 2290448 A | 1/1996 | |
| IN | 139746 A1 | 7/1976 | |
| IN | 145178 A1 | 9/1977 | |
| WO | 82/02475 A1 | 8/1982 | |
| WO | 88/01719 A1 | 3/1988 | |
| WO | 98/15185 A1 | 4/1998 | |

OTHER PUBLICATIONS

Webster's Online Dictionary, Definition of "Naan", www.websters-online-dictionary.org/definition/NAAN, 4 pages, Jun. 17, 2005.
Spiritual Practice, Krsna Prasadam, NAAN bread recipes, www.harekrsna.com/practice/prasadam/recipes/breads5.htm, 5 pages, May 15, 2005.
Taste of Life, Naan Bread recipe, www.tasteoflife.com/097_03.html, 2 pages, Sep. 30, 2002.
Indian Food Forever, Naan Bread recipe, www.indianfoodforever.com, 3 pages, Jul. 29, 2005.
International Preliminary Report on Patentability issued Mar. 31, 2009 in co-pending PCT application No. PCT/CA2006/001612.
Office Action mailed Dec. 18, 2012 in co-pending U.S. Appl. No. 13/432,795.
Office Action mailed Jan. 15, 2013 in co-pending U.S. Appl. No. 13/040,790.
The Best Recipe, by the editors of Cook's Illustrated, 1999, pp. 333-337.
Office Action dated Jul. 21, 2011 in co-pending U.S. Appl. No. 12/310,827.
International Search Report dated Dec. 3, 2008 in co-pending foreign application PCT/CA2008/001316.
International Search Report dated Apr. 15, 2009 in corresponding foreign application PCT/CA2008/001317.
Office Action—Restriction—mailed Apr. 2, 2013 in co-pending U.S. Appl. No. 13/054,241.
UK Communication dated May 23, 2011 in co-pending foreign patent application No. GB0820448.9, 1 page.
Mewburn Ellos 3dP Observation, dated May 13, 2011, 19 pages, regarding co-pending foreign patent application No. GB0820448.9.
Prepared Foods, Oct. 2006, pp. 11-18, "'Naan' too Soon", Roberts, W.A.
The Globe and Mail, Oct. 9, 2006, 3 pages, "The world is flatbread for bakery behind PC naan", Strauss, M.
USPTO Trademark Serial No. 78949769, http://tess2.upsto.gov/bin/showfield?f=doc&state=4008:b3s5sk.2.1, accessed Apr. 15, 2011.
Office Action mailed Jun. 26, 2013 in co-pending U.S. Appl. No. 13/054,241.
Office Action—Restriction—mailed Feb. 27, 2012 in co-pending U.S. Appl. No. 13/040,790.
Restaurants & Institutions, Apr. 1, 1995, pp. 58-76, "Authentic Ethnics", by Johnson.
Food Manufacture, Feb. 2000, pp. 38-39, "Naan Bread Revolution", Darrington, H.
Restaurants & Institutions, Apr. 1, 1995, pp. 62-76, "Authentic Ethnics India: Spices Provide India with a Wealth of Flavorings Known to no other culinary repertoire", Johnson, B. A.
Baking & Snack, Dec. 1996, vol. 18, No. 11, pp. 46-52, "The facts about flat bread processing", Gorton, L.
British Baker, Sep. 21, 2001, pp. 18-24, "Tunnel Ovens: Winning the space race".
http://en.wikipedia.org/wiki/Tandoor, definition of "Tandoor", Sep. 19, 2006.
http://en.wikipedia.org/wiki/Naan, definition of "Naan", Sep. 19, 2006.
California Conference of Director of Environmental Health, Jul. 1999, "Guidelines for the Installation and Use of Tandoor Ovens", pp. 1-3.
www.beechovens.com, "Beech Ovens: Reinventing Tandoori Technology", (Sep. 19, 2006), pp. 1-8.
www.beechovens.com.au/index.php?pg=tan, "Beech Ovens: Manufacturer of Wood Fired Ovens and Gas Stone Hearth Ovens for the World's Leading Hoteliers", Sep. 19, 2006, copyright 1999-2006, pp. 1-6.
International Search Report dated Jun. 13, 2007 in co-pending foreign patent application PCT/CA2006/001612.
Written Opinion of the International Searching Authority dated Dec. 3, 2008 in corresponding foreign application CA2008/001316.
International Preliminary Report on Patentability issued Jan. 18, 2011 in corresponding foreign application PCT/CA2008/001316.
Written Opinion of the International Searching Authority dated Apr. 15, 2009 in co-pending foreign application PCT/CA2008/001317.
International Preliminary Report on Patentabiity issued Jan. 18, 2011 in co-pending foreign application PCT/CA2008/001317.
Atwell, William A., "Chapter 6, Products From Hard Wheat Flour: Problems, Causes, and Resolutions," in: Wheat Flour, (Eagan Press Handbook Series, 2001), pp. 79-95.
C.H. Babb Co., Inc., "For Mideast Bread Ovens or Fully Automated Bakery Systems," brochure, allegedly available as of 2004.
Captures of C.H. Babb Co., Inc. website from 2004 [WaybackMachine], [retrieved on Aug. 19, 2013]. Retrieved from the Internet <URL: web.archive.org/web/20040206203406/http://babbco.com/ovens.html>.
"The Fabulous Indian Breads." Available online at www.angelfire.com on Dec. 15, 2005.
Food Machinery Engineering Brochure, "Arabic Bread Oven Model K-174," (unknown date).

(56) References Cited

OTHER PUBLICATIONS

Fredrich et al. "Micromechanics of Thermally Induced Cracking in Three Crystal Rocks," Journal of Geophysical Research, vol. 91, No. B12, p. 12,743-12,744. Nov. 10, 1986.

Khurana, Laxmi, "An Indian Housewife's Recipe Book," Jaico Publishing House, 1996, pp. 12-13.

Meredith, P.G. et al. "Fracture Toughness and Subcritical Crack Growth During High-Temperature Tensile Deformation of Westerly Granite and Black Gabbro," Physics of the Earth and Planetary Interiors, 39 (1985) 33-51. Elsevier Science Publishers B.V., Amsterdam.

Qarooni, Jalal, "Flat Bread Technology," International Thomson Publishing, pp. 98-101, 194-201, 1996.

Rai, Ranjit, "Construction of the Tandoor" and "Tenderizers" in: Tandoor: The Great Indian Barbeque, (Overlook Press, 2001), pp. 104-105.

The Tile Man Inc., "Vintage Tile Pattern," [retrieved on Apr. 20, 2005]. Retrieved from the Internet <URL: http://www.thetileman.com/vintage.html>.

Wang, et al. "Thermal Stress Cracking in Granite," Journal of Geophysical Research, vol. 94, No. B2, p. 1745-1758. Feb. 10, 1989.

Final Rejection mailed Sep. 26, 2012 in co-pending U.S. Appl. No. 12/310,827.

* cited by examiner

INTERMEDIATE PANEL CEILING FOR CONVEYOR OVEN

FIELD OF THE INVENTION

The invention relates to commercial baking ovens, and more particularly to commercial baking ovens using an endless conveyor.

BACKGROUND OF THE INVENTION

Conveyor ovens are increasingly popular in commercial baking. Food to be baked (such as, unbaked loaves of bread) is loaded on a continuous conveyor which passes through a heated oven chamber to emerge in baked form on the other side. In order to be efficient, such ovens must be carefully sealed and insulated to retain heat.

Due to the closed nature of the oven housing, it may be difficult to manage the distribution of heat in the oven chamber, and "hot spots" can result. In the worst case, if excessive heat builds up in a particular area, spontaneous fires can occur. Left unchecked, a fire can cause tremendous damage to the oven, surrounding areas, and may even cause human injury.

Certain types of conveyor ovens have been provided with reflective heat shields or baffles. Often used with radiant heat, these designs reflect heat down onto the food item, which may be desirable for broiling applications (such as for meat). However, this does not provide effective heat distribution for high temperature baking applications, in which it is undesirable to reflect the heat directly onto the food. Such heat shields or baffles would also tend to increase not decrease the fire risk in a high temperature baking application.

The use of stone or ceramic heat sinks in the baking chamber has also been proposed. These materials absorb heat and return it to the baking chamber in an attenuated way. However, under high heat stresses, such materials can fail, causing cracks or crumbling to occur in the stone. Further, such heat sinks are usually provided as a cladding on the walls of the oven. This limits their effectiveness since the slabs are attached to the walls of the oven, and have only one side exposed to the heated baking chamber.

There is an outstanding need for a conveyor oven design that can effectively distribute high heat within the oven chamber.

SUMMARY OF THE INVENTION

According to a first aspect of the invention, a conveyor oven is provided. The oven has an oven housing, which has a substantially rectangular box frame, with a top wall and side walls downwardly depending form the top wall, and a bottom wall connecting the side walls. Inside the oven housing is an interior baking chamber. An exhaust is connected to the baking chamber. The oven is heated by a heat source that is capable of heating the baking chamber to a temperature in excess of 700° F. The oven has an endless conveyor for transporting food items to be baked through the baking chamber.

An intermediate panel ceiling assembly is disposed within the baking chamber. A plurality of ceiling panel holders are mounted above the conveyor and spaced below the top wall in the baking chamber of the oven. Each ceiling panel holder substantially spans the width of the baking chamber. The ceiling panel holders each hold at least one ceiling panel. The ceiling panel is exposed on both sides to the baking chamber for absorbing and distributing heat in the baking chamber.

Preferably, the ceiling panels are insulated boxes having a heat-safe cladding, such as a low-carbon steel. Preferably, the boxes are insulated with rock wool. They may also be insulated with sand.

Each ceiling panel holder has a frame for holding the at least one ceiling panel. This frame may be any convenient shape. Preferably, the frame is substantially rectangular, having two longer sides and two shorter sides. The longer sides are sized to span the width of the baking chamber. In one embodiment, the frame preferably has a bowed profile across the width of the baking chamber.

Preferably, each ceiling panel holder carries two ceiling panels. The ceiling panels may be disposed parallel to each other in the ceiling panel holder, or more preferably, they may be disposed at an angle to each other.

Preferably, the ceiling panels in the ceiling panel holders are arranged to be non-parallel with the top wall or the bottom wall of the oven housing.

The ceiling panels are shaped to fit within the ceiling panel holders and may be any convenient shape. However, preferably, they have a substantially planar top surface, and a substantially planar bottom surface.

The frame of the ceiling panel holder preferably has a bottom flange on which the ceiling panels are held. The frame may have a gap beside the ceiling panel or between the ceiling panels to permit combustion products to pass through the ceiling panel holder.

For mounting in the oven, each ceiling panel holder may have a pair of side lips extending outward from the frame to engage with a pair of corresponding rails in the baking chamber. The ceiling panel holders may be mounted in any arrangement that exposes the ceiling panels to the baking chamber. Preferably, the ceiling panel holders are disposed in a line extending substantially over the length of the baking chamber. The ceiling panel holders may be abutted together, or they may be spaced apart. If spaced apart, the ceiling panel holders are preferably disposed at an even spacing from each other over the length of the baking chamber.

The oven itself is preferably heated by gas burners. The heat is preferably zoned.

According to a second aspect of the invention, an intermediate panel ceiling assembly is provided. In the assembly, at least one ceiling panel holder is provided having a frame with mounting edges for mounting in the oven. At least one ceiling panel is held within each ceiling panel holder on flanges of the frame. The flanges carry the at least one ceiling panel without substantially covering a top surface or a bottom surface thereof, such that the ceiling panel is exposed on both sides for absorbing and distributing heat when mounted away from a top wall within a baking chamber of a conveyor oven.

DETAILED DESCRIPTION OF THE DRAWINGS

Figure 1:
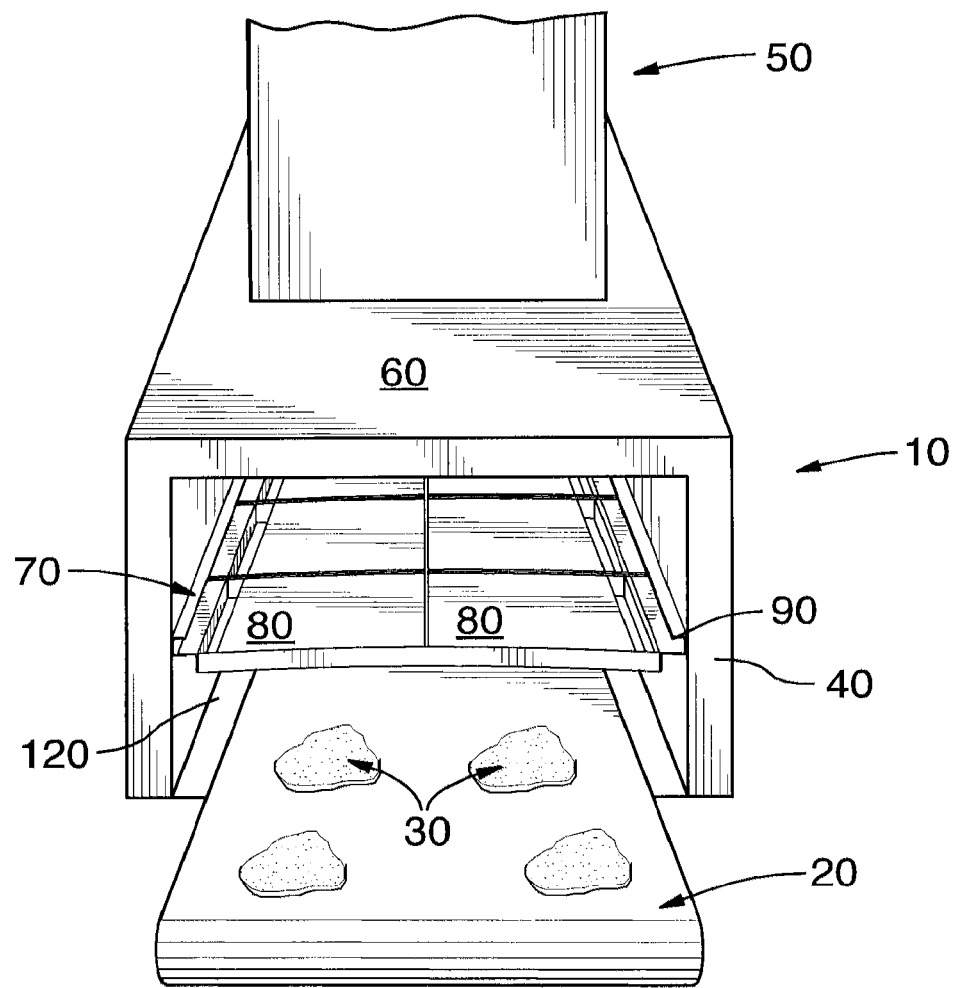
FIG. 1 is an end view of a conveyor oven according to the preferred embodiment, showing the intermediate panel ceiling.

A conveyor oven 10 is provided as shown in FIG. 1. A conveyor 20 takes unbaked food items 30 and transports them through a baking chamber. The conveyor oven 10 is a high temperature baking oven capable of baking in excess of 700° F. (and most preferably, in excess of 1000° F.). This high temperature bake is particularly suited to certain types of flatbreads, particularly naan bread, lavash, and focaccia, wherein a certain amount of charring is considered desirable. The temperature is well above the normal baking temperature of standard loaf breads, muffins, pizza (typically, in the range of 300° F. to 600° F.). This high temperature makes the oven particularly susceptible to sudden and very dangerous fires.

The oven housing is basically an insulated box. The housing has a top wall 60 and side walls 40. A bottom wall (not shown) joins the side walls 40 providing a substantially enclosed baking chamber. One or more exhaust stacks 50 are provided.

Heat may be provided by gas burners (not shown). Preferably, heat in the baking chamber is "zoned". That is, separate controls are provided for successive "zones" of burners over the length of the oven. This allows fine level of adjustment of the heat profile to promote a better bake.

Within the baking chamber, an intermediate panel ceiling is provided, as shown in FIG. 1. The intermediate panel ceiling is mounted to span the width of the baking chamber. It is mounted on the inside of side walls 40 at a distance spaced below the top wall 60, and spaced above conveyor 20 (approximately 12 to 20 inches from the conveyor). The intermediate panel ceiling has heat-safe ceiling panels 80 that absorb and redistribute heat in the baking chamber.

Figure 3:
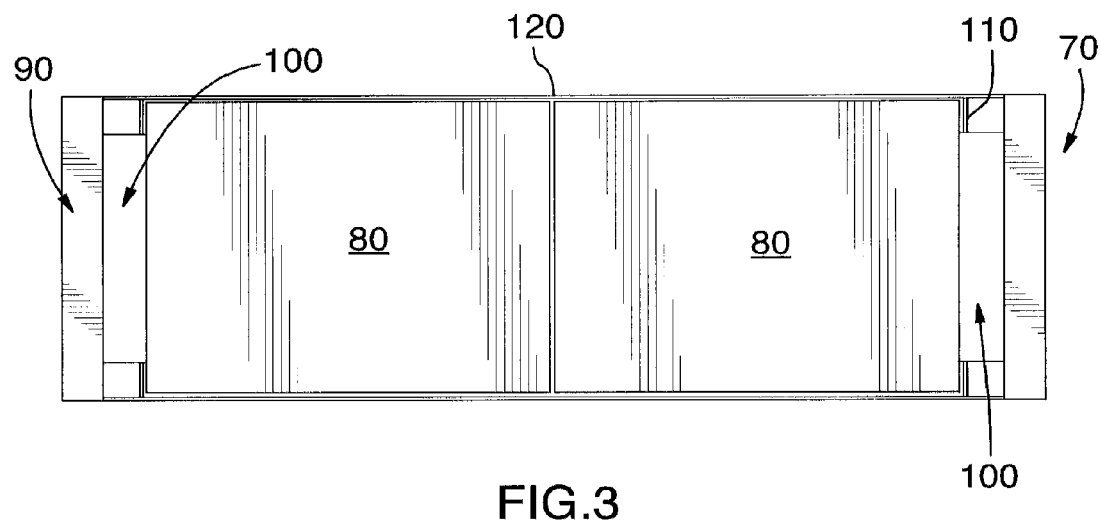
FIG. 3 is a top view of a ceiling panel holder with ceiling panels.
Figure 4:
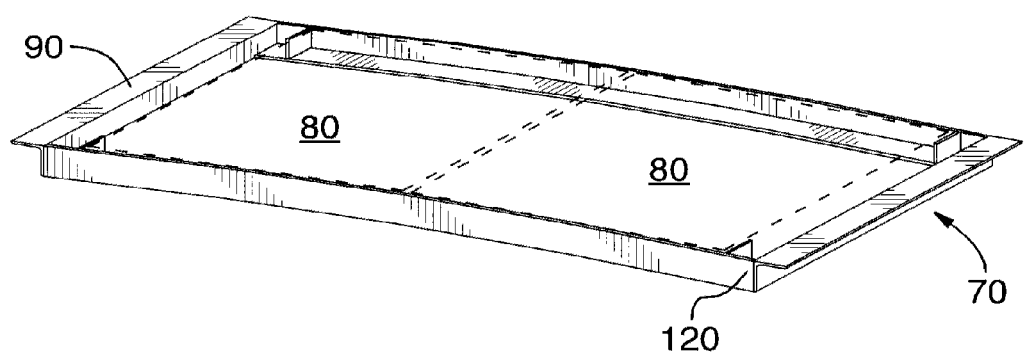
FIG. 4 is a perspective end view of a ceiling panel holder.

The ceiling panels 80 are held in ceiling panel holders 70, as shown in FIGS. 3 and 4. Each holder has a frame 120 that preferably carries two ceiling panels. The ceiling panel holders 70 preferably have flanges 110 for retaining the ceiling panels in the frame. As shown in FIG. 3, the ceiling panels 80 may be retained more or less centrally in the frame 120, having gap openings 100 on either side. These gaps 100 provide a channel for smoky air to escape through the intermediate panel ceiling.

Figure 5:
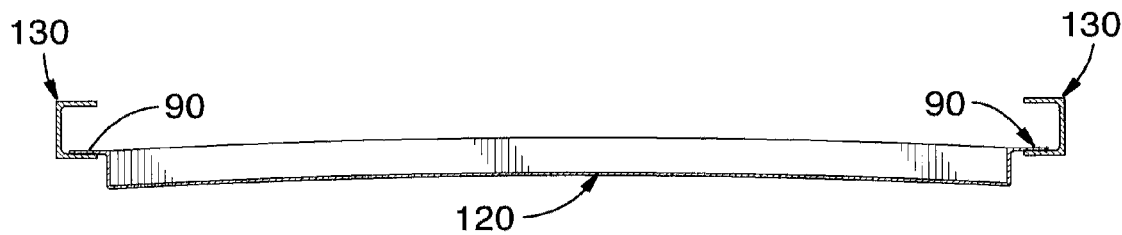
FIG. 5 is an isometric end view of a ceiling panel holder and retaining rails.

As shown in FIG. 5, the frames 120 of the ceiling panel holders 70 preferably have side lip flanges 90 that engage corresponding rails/tracks 130 in the oven housing. The ceiling panel holders 70 are preferably mounted in an aligned arrangement along the length of the baking chamber (in abutted or spaced apart relation to each other), such that they serve as an intermediate ceiling in the oven, as shown in FIG. 1. The intermediate ceiling may be slightly "domed" as the frames 120 of the panel holders 70 may have a slight bow shape, as shown in FIGS. 4 and 5. The ceiling panels 80 when held in the panel holders may be at a slight angle to each other due to the bow shape. The overall domed shape of the intermediate ceiling is believed to provide a very stable structure and has good heat redistributing properties. The heat is directed evenly across the dough surface.

Figure 6:
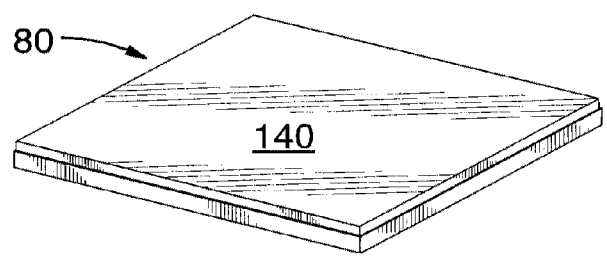
FIG. 6 is a perspective view of a ceiling panel.
Figure 7:
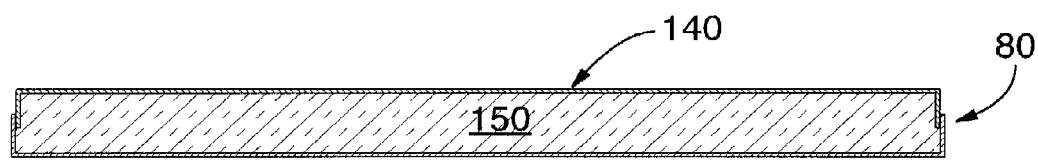
FIG. 7 is a sectional view of the ceiling panel in FIG. 6.

The panels 80 themselves may also be bowed, but as shown in the Figures, are not necessarily bowed. These are preferably flat box-shaped structures. As shown in FIGS. 6 and 7, the panels 80 have a flat top (or bottom) surface 140 and may be reversible. The box is preferably clad with a heat-safe material, such as low-carbon steel (to safely absorb heat and return it safely to the baking chamber). The insulation 150 is preferably sand.

Figure 2:
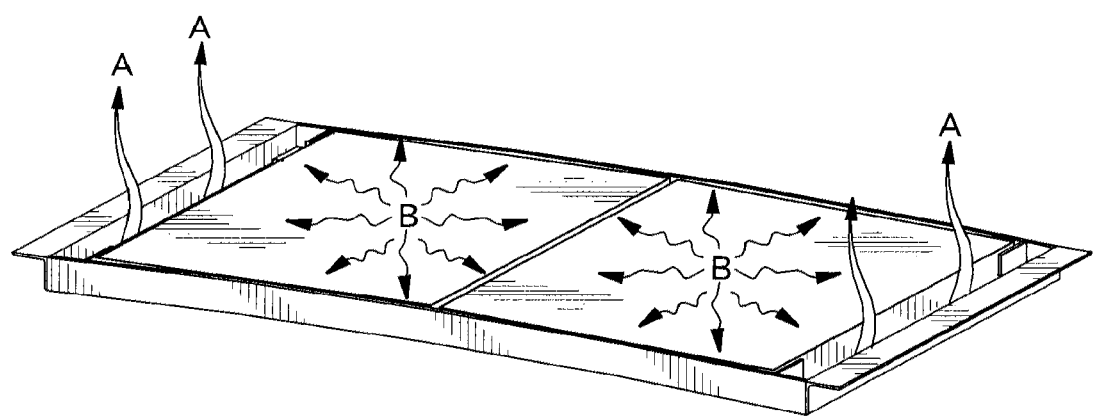
FIG. 2 is a perspective view of a ceiling panel holder with ceiling panels, showing air and heat flows.

The frames 120 of the ceiling panel holders 70 are designed to retain the ceiling panels near the edges, so that the broad surfaces of the panels 80 are substantially exposed to the baking chamber. The panels absorb heat and re-distribute it over the surface of the panels to minimize hot spots in the oven. FIG. 2 illustrates schematically the heat flows (B) over the ceiling panels and air flows (A) through the ceiling panel holder. Smoky air and soot (combustion products) are allowed to escape through gaps 100 for venting through exhaust stack 50. Smoke build-up is a particular concern in high temperature baking as the temperatures are sufficient that singeing of the food readily occurs and small flare-ups are common (and may be desirable—e.g. for slight charring of certain flatbreads, such as naan) in the course of baking.

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

The invention claimed is:

1. A high temperature commercial conveyor oven, comprising:
   an oven housing having a substantially rectangular box frame, clad with an insulated top wall and insulated side walls downwardly depending from the insulated top wall, a bottom wall connecting the side walls, all defining an interior baking chamber;
   an exhaust connected to the interior baking chamber;
   a heat source for heating the interior baking chamber in excess of 700° F.;
   an endless conveyor for transporting food items to be baked through the interior baking chamber; and
   an intermediate panel ceiling assembly disposed within the baking chamber, wherein the intermediate panel ceiling assembly comprises:
      a plurality of ceiling panel holders mounted above the conveyor and spaced below the top wall, each ceiling panel holder substantially spanning the width of the interior baking chamber and having a plurality of flanges; and
      at least one ceiling panel held within each ceiling panel holder by the flanges; the at least one ceiling panel being exposed on both sides to the interior baking chamber for absorbing and distributing heat in the interior baking chamber, and wherein the at least one ceiling panel comprises an insulated box containing rock wool or sand;
      wherein each ceiling panel holder comprises a frame for holding the at least one ceiling panel, each ceiling panel holder further comprising a pair of side lips extending outward from the frame, and the side walls of the oven having a pair of corresponding rails for engaging the side lips to hold each of the ceiling panel holders in the interior baking chamber; and
      wherein each frame has a gap beside the ceiling panel or between the ceiling panels to permit combustion products to pass through the ceiling panel holder.

2. The conveyor oven of claim 1, wherein the insulated box comprises a heat-safe cladding.

3. The conveyor oven of claim 1, wherein the insulated box is clad in steel.

4. The conveyor oven of claim 3, wherein the steel comprises a low-carbon steel.

5. The conveyor oven of claim 1, wherein each frame is substantially rectangular.

6. The conveyor oven of claim 1, wherein each frame has two longer sides and two shorter sides, the longer sides spanning the width of the baking chamber.

7. The conveyor oven of claim 1, wherein each frame has a bowed profile across the width of the baking chamber.

8. The conveyor oven of claim 1, wherein each ceiling panel holder carries two ceiling panels.

9. The conveyor oven of claim 8, wherein the ceiling panels are disposed at an angle to each other.

10. The conveyor oven of claim 1, wherein the ceiling panels in the ceiling panel holders are arranged to be non-parallel with the top wall or the bottom wall of the oven housing.

11. The conveyor oven of claim 1, wherein the ceiling panels have a substantially planar top surface, and a substantially planar bottom surface.

12. The conveyor oven of claim 1, wherein each frame has a bottom flange on which the ceiling panels are held.

13. The conveyor oven of claim 1, wherein the ceiling panel holders are disposed in a line extending substantially over the length of the interior baking chamber.

14. The conveyor oven of claim 1, wherein the ceiling panel holders are disposed at an even spacing from each other over the length of the interior baking chamber.

15. The conveyor oven of claim 1, wherein the ceiling panel holders are disposed in substantial abutment with each other over the length of the interior baking chamber.

16. The conveyor oven of claim 1, wherein the heat source is gas burners.

17. The conveyor oven of claim 16, wherein the gas burners have a plurality of controls allowing zoned heat with the baking chamber.

* * * * *